United States Patent [19]
Stefek et al.

[11] Patent Number: 6,135,648
[45] Date of Patent: Oct. 24, 2000

[54] HARD DISK ROTATIONAL LATENCY SIMULATOR

[75] Inventors: Steven K. Stefek, Loveland; Graeme M. Weston-Lewis, Fort Collins, both of Colo.

[73] Assignee: LSI Logic Corporation, Milpitas, Calif.

[21] Appl. No.: 08/747,485

[22] Filed: Nov. 12, 1996

[51] Int. Cl.[7] .............................. G06F 17/50; G06G 7/62
[52] U.S. Cl. ........................................................ 395/500.34
[58] Field of Search ............................ 364/578; 395/500, 395/500.44, 500.45, 500.34

[56] References Cited

U.S. PATENT DOCUMENTS

| | | | |
|---|---|---|---|
| 4,268,905 | 5/1981 | Johann et al. | 395/500 |
| 4,504,871 | 3/1985 | Berwick et al. | 360/31 |
| 4,718,064 | 1/1988 | Edwards et al. | 395/500 |
| 4,725,968 | 2/1988 | Baldwin et al. | 364/550 |
| 4,746,995 | 5/1988 | Rauskolb | 360/31 |
| 5,121,492 | 6/1992 | Saville, III et al. | 395/500 |
| 5,131,089 | 7/1992 | Cole | 395/500 |
| 5,404,492 | 4/1995 | Moraru et al. | 395/500 |
| 5,459,850 | 10/1995 | Clay et al. | 395/497.02 |
| 5,717,886 | 2/1998 | Miyauchi | 395/430 |

*Primary Examiner*—Kevin J. Teska
*Assistant Examiner*—Hugh Jones

[57] ABSTRACT

A hard disk simulator that comprises a timing generator controller coupled to receive address, data and control signals; a timing generator for providing a pulse in response to signals received from the timing generator controller; and an address generator coupled to receive the control or index pulse and a programmable frequency clock to generate addresses for a hard disk simulator. The address generator includes an offset counter that generates values in response to the programmable frequency clock and the control pulse. The address generator also receives a base address that corresponds to a hard disk track. The offset counter values and the base address are combined to provide an address. The present invention also includes a method of simulating a hard disk including the step of adding an offset value to a base value to simulate rotational latency of the hard disk. The method further includes at least one of the following steps: generating the offset value from a programmable frequency clock signal that corresponds to at least two hard disk zones; resetting the offset value in response to a pulse that corresponds to a hard disk index signal; and providing base values that each correspond to respective hard disk tracks.

7 Claims, 5 Drawing Sheets

HARD DISK ROTATIONAL LATENCY SIMULATOR

FIELD OF THE INVENTION

The present invention relates to a hard disk simulator and more particularly to a solid state apparatus that simulates the rotational latency of a hard disk.

BACKGROUND OF THE INVENTION

Development of disk drive electronics, such as data controllers, has typically required the availability of at least a prototype hard disk assembly for testing and firmware generation. Since the time required to develop a hard disk assembly ("HDA") to a level that will allow data to be written and read using it requires a substantial amount of time, the disk drive electronics development is delayed. In addition, the disk drive electronics are used by various vendors with characteristically different HDAs. Thus, complete testing and firmware generation are constrained by the different characteristics of the utilized HDA.

A need exists to provide an HDA early in the development of the hard disk electronics. To this end, an HDA simulator is desirable. Such a simulator provides for early testing and firmware generation that will allow a significant advantage in the hard disk electronics development cycle. The HDA simulator also allows designers of disk drive electronics to test new designs in a simulated HDA environment without the constraints of the unique characteristics of the various HDAs. Ultimately, such an HDA simulator will save development time and money, and should provide a higher quality product.

SUMMARY OF THE INVENTION

The present invention includes a hard disk simulator. This simulator comprises a timing generator controller coupled to receive address, data and control signals; a timing generator for providing pulses in response to signals received from the timing generator controller; and an address generator coupled to receive the pulses, including a control or index pulse, and a programmable frequency clock to generate addresses for a hard disk simulator.

The address generator includes an offset counter that generates values in response to the programmable frequency clock and the control pulse. The address generator also receives a base address that corresponds to a hard disk track. The offset counter values and the base address are combined to provide an address.

The present invention also includes a method of simulating a hard disk including the step of adding an offset value to a base value to simulate rotational latency of the hard disk. The method further includes at least one of the following steps: generating the offset value from a programmable frequency clock signal that corresponds to at least two hard disk zones; resetting the offset value in response to a pulse that corresponds to a hard disk index signal; and providing base values that each correspond to respective virtual hard disk tracks.

Numerous other advantages and features of the present invention will become readily apparent from the following detailed description of the invention and the embodiment thereof, from the claims and from the accompanying drawings in which details of the invention are fully and completely disclosed as a part of this specification.

DETAILED DESCRIPTION OF THE PREFERRED EMBODIMENT

Figure 1:
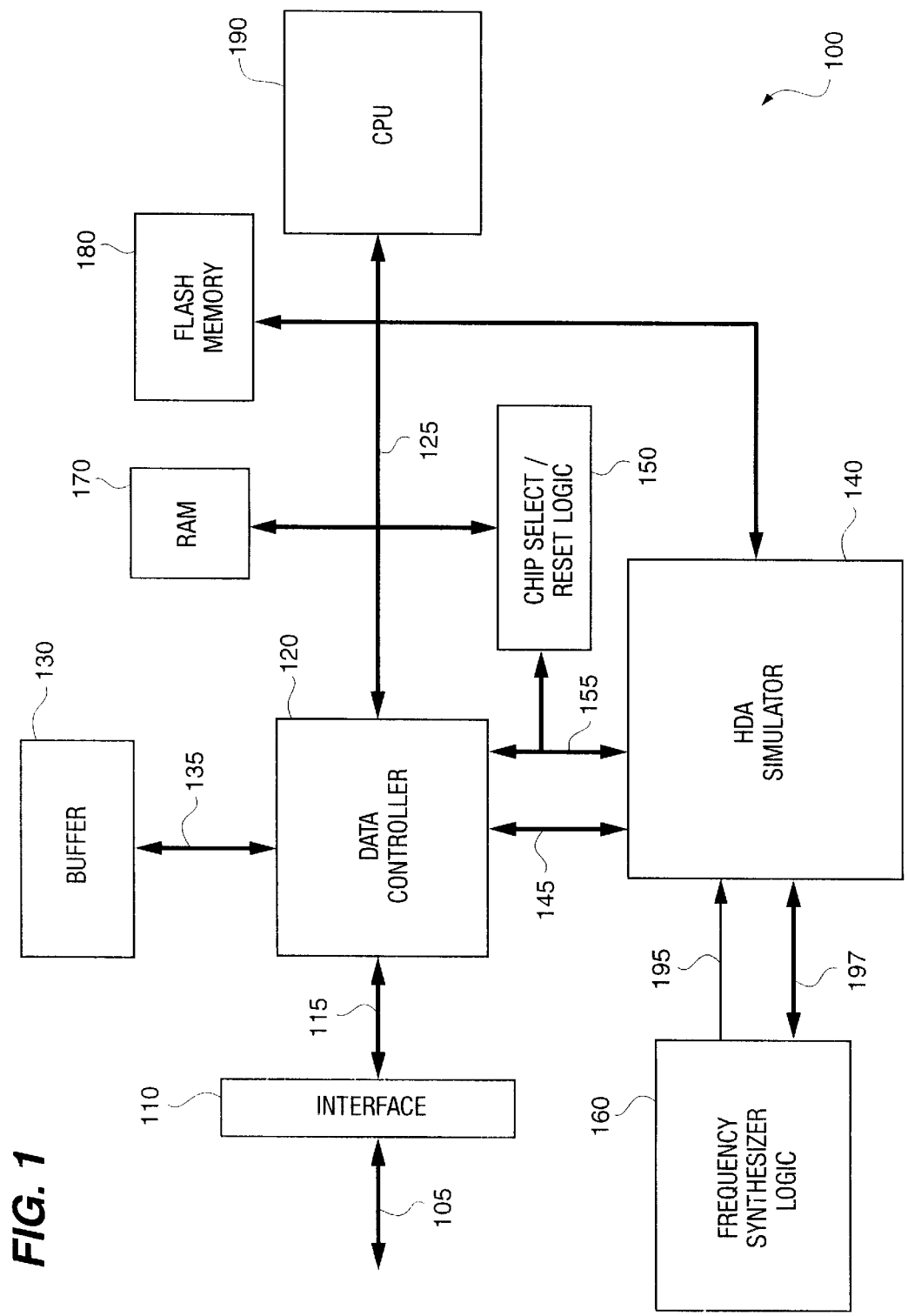
FIG. 1 is a block diagram of a simulated disk drive incorporating the present invention.

While this invention is susceptible of embodiment in many different forms, there is shown in the drawings and will be described herein in detail a specific embodiment thereof with the understanding that the present disclosure is to be considered as an exemplification of the principles of the invention and is not to be limited to the specific embodiment described.

FIG. 1 illustrates a block diagram of a simulated disk drive 100 incorporating the present invention. Simulated disk drive 100 includes an interface block 110 that is coupled to a host (not shown) via a bus 105. Interface block 110 is also coupled to a data controller 120 via a bus 115. Data controller 120 can conform to, for example, SCSI, Ultra SCSI, Ultra SCSI II, Fibre Channel or 1394 standards for data transfer.

Data controller 120 is further coupled to buffer 130 via bus 135. Buffer 130 stores data that is transferred between simulated disk drive 100 and the host. Data controller 120 is coupled to an HDA simulator 140 via a bus 145, and to both HDA simulator 140 and a chip select/reset logic 150 via a bus 155. HDA simulator 140 is coupled to a frequency synthesizer logic 160 via a lead 195 and a bus 197.

A bus 125 couples data controller 120, chip select/reset logic 150, a RAM 170, a FLASH memory 180 and a CPU 190. Flash memory 180 permanently stores firmware for CPU 190 to operate simulated disk controller 100. RAM 170 stores temporary variables when the system is operating. CPU 190 is preferably an Intel-base XX186 microprocessor, and more preferably an AMD 186EM available from Advanced Micro Devices. Chip select/reset logic 150 provides chip select signals to HDA simulator 140 in response to information, such as address and control signals, from CPU 190. Control signals typically include a chip select signal, a read signal and a write signal.

Figure 2:
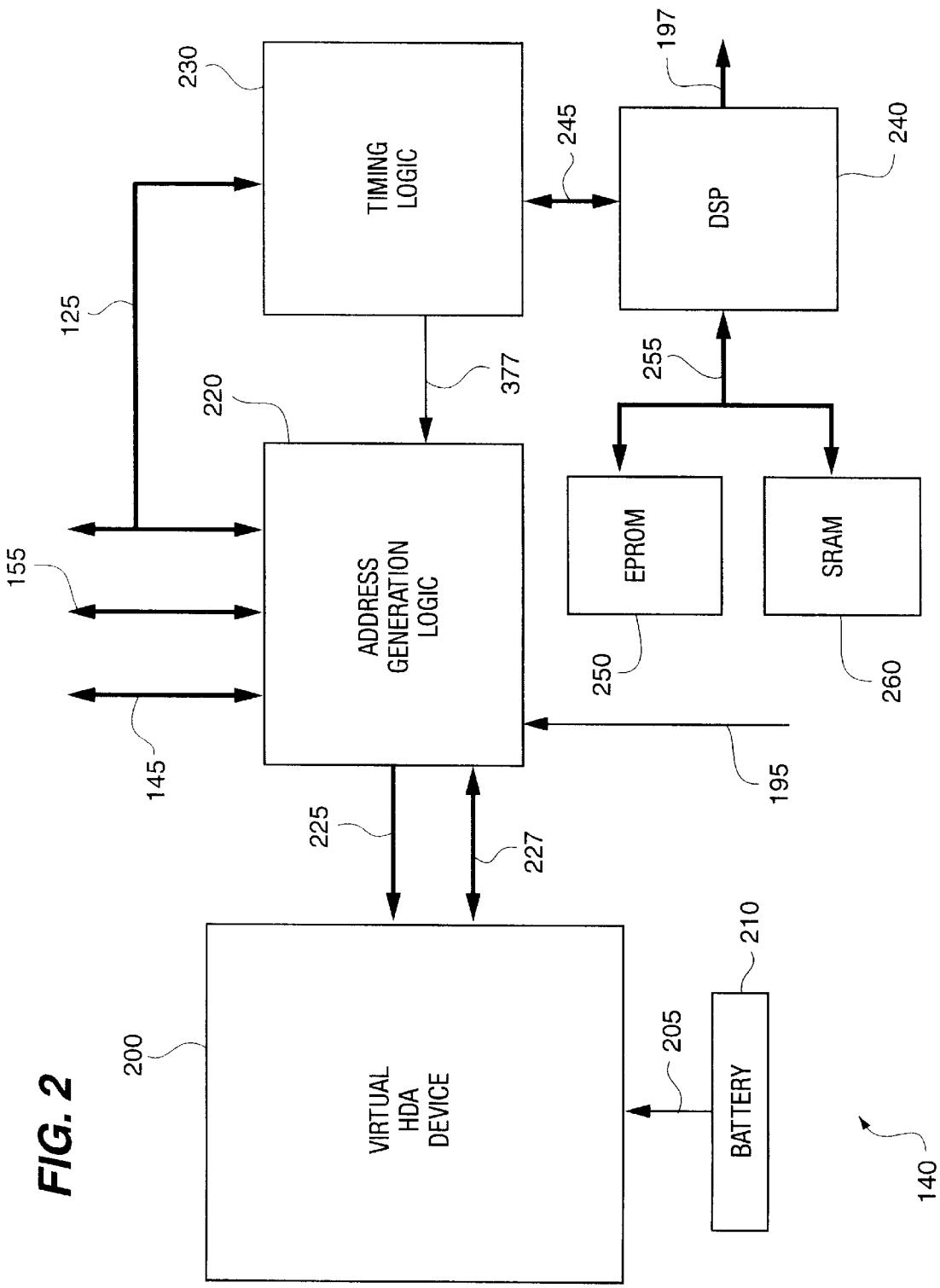
FIG. 2 is a detailed block diagram of the HDA simulator illustrated in FIG. 1.

FIG. 2 illustrates a more detailed block diagram of HDA simulator 140 of the present invention. HDA simulator 140 includes a virtual HDA device 200 that is coupled to a battery 210 via a lead 205. Preferably, virtual HDA device 200 is configured with up to four banks of 16 Mbx32 SRAM, although the present invention is not limited to this configuration, capacity or memory type. Battery 210 provides power to maintain the contents of virtual HDA device 200 while disk drive simulator 100 is not powered. A recharging circuit (not shown) can be used to recharge battery 210 when disk drive simulator 100 is powered. Virtual HDA device 200 is also coupled to an address generation logic 220 via buses 225 and 227.

Address generation logic 220 is coupled to data controller 120, chip select/reset logic 150, frequency synthesizer logic 160 and CPU 190 (all shown in FIG. 1) via buses 125, 145, 155 and lead 195. Address generation logic 220 is further coupled to a timing logic 230 via a lead 377. Timing logic 230 is also coupled to CPU 190 via bus 125, and is additionally coupled to a DSP 240 via a bus 240. It is preferred that DSP 240 is a digital processor such as a Texas Instrument-based 320C25 digital signal processor. More preferably, DSP 240 is a SYM320C25 or SYM320C25X2 digital signal processor core available from Symbios Logic Inc. Address generation logic 220 is preferably implemented with two 208-pin CPLD devices. Since no address space is duplicated between the two devices, both devices are able to use the same chip select. This architecture allows the functionality of rotating media address generation, to be performed in one CPLD device and functionality of multiplex and demultiplex and data control to be handled in the other. Likewise, timing logic 230 is also preferably implemented with two 208-pin CPLD devices. Alternatively, both logic 220 and 230 can be implemented using discrete logic or in an ASIC.

DSP 240 is coupled to frequency synthesizer logic 160 via lead 197. DSP 240 is also coupled to an EPROM 250 and an SRAM 260 via a bus 255. EPROM 250 permanently stores the firmware for DSP 240 to control HDA simulator 140. SRAM 260 is loaded with the firmware upon HDA simulator 140 receiving power.

Figure 3:
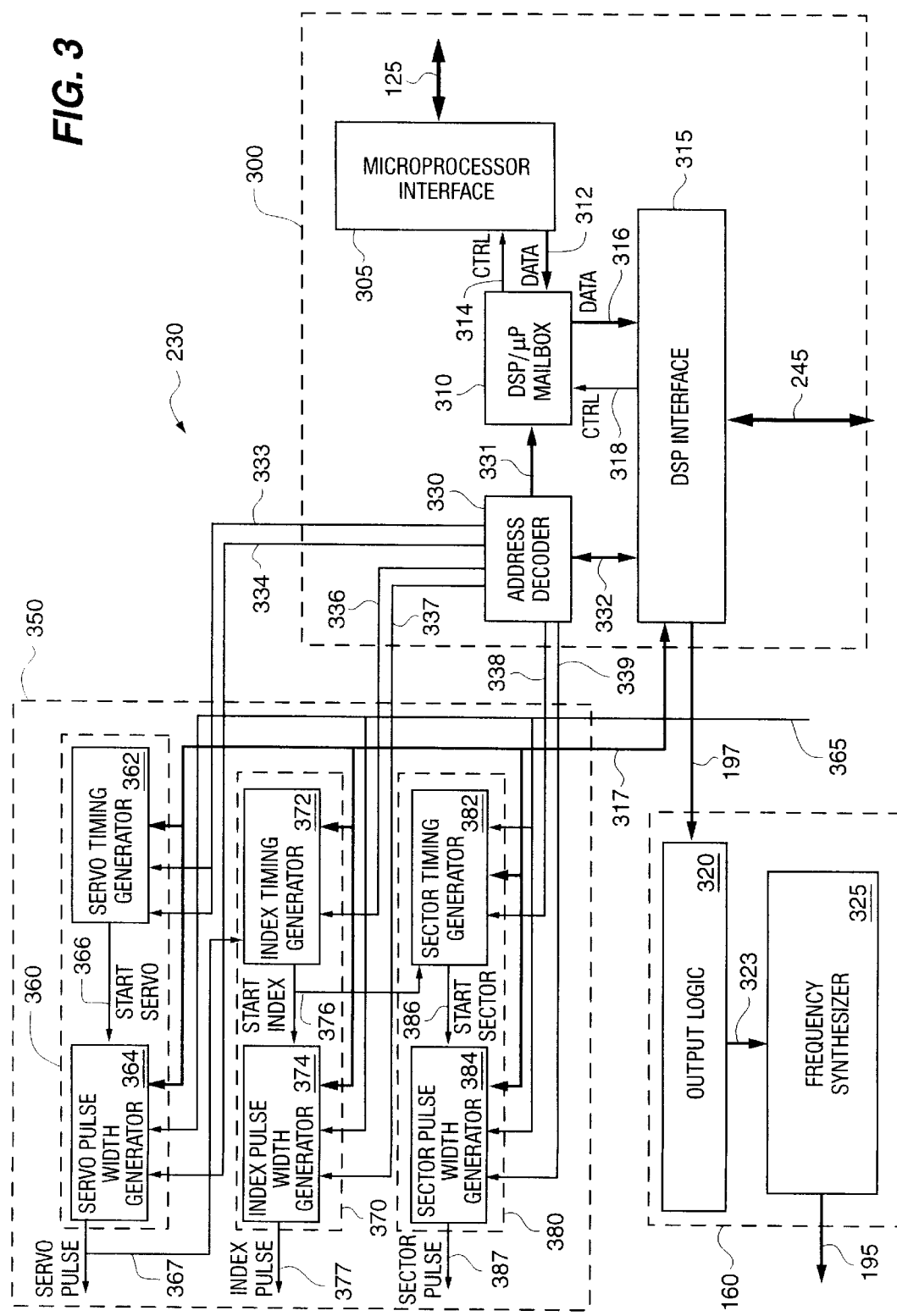
FIG. 3 is a detailed block diagram of the timing logic and the frequency Synthesizer logic illustrated in FIGS. 1 and 2.

FIG. 3 is a detailed block diagram of timing logic 230 and frequency synthesizer logic 160 illustrated in FIGS. 1 and 2. Timing logic 230 includes a timing generator controller 300 and a timing generator 350. Timing generator controller 300 includes a microprocessor interface 305 coupled to CPU 190 via bus 125. Microprocessor interface 305 sends data to and receives a control signal from a DSP/μP mailbox 310 via a bus 312 and a lead 314, respectively. DSP/μP mailbox 310 sends data and receives a control signal from a DSP interface via a bus 316 and a lead 318, respectively. DSP/μP mailbox 310 provides information transfer between CPU 190 and DSP 240. DSP/μP mailbox 310 preferably is a 16-bit register. Control bits, readily discernible by a skilled artisan, enable communication between CPU 190 and DSP 240.

DSP interface 315 is coupled to DSP 240 (FIG. 2) via bus 245 and is connected to a bus 317. DSP interface 315 is also coupled to frequency generator logic 160 via bus 197. Frequency generator logic 160 includes an output logic 320 coupled to DSP interface 315 via bus 197 and to a frequency synthesizer 325 via bus 323. Frequency synthesizer 325 preferably provides a programmable frequency clock signal under the control of DSP 240. Frequency synthesizer 325 provides the programmable frequency clock signal on lead 195.

An address decoder 330 is coupled to DSP/μP mailbox 310 via a lead 331 and to DSP interface 315 via bus 332. Address decoder 330 is connected to leads 333, 334, 336, 337, 338 and 339. Address decoder 330 generates enables for the appropriate read/write strobes for the corresponding registers in timing logic 230.

Timing generator 350 includes a servo pulse generator 360, an index pulse generator 370 and a sector pulse generator 380. Servo generator 360 includes a servo timing generator 362 coupled to a servo pulse width generator 364 via a lead 366. Servo timing generator 362 and servo pulse width generator 364 are coupled to receive a system clock signal, preferably 40 MHz, via a lead 365. Servo timing generator 362 and servo pulse width generator 264 are further coupled to DSP interface 315 via bus 317, and are coupled to address decoder 330 via respective leads 333, 334. Servo index pulse width generator 364 provides a servo pulse on a lead 367.

Index pulse generator 370 includes an index timing generator 372 coupled to a index pulse width generator 374 via a lead 376. Index timing generator is also coupled to servo pulse width generator 364 via lead 367. Index pulse width generator 274 is coupled to receive the system clock signal via lead 365. Index timing generator 372 and index pulse width generator 374 are further coupled to DSP interface 315 via bus 317, and are coupled to address decoder 330 via respective leads 336, 337. Index pulse width generator 374 also provides an index pulse on a lead 377.

Sector pulse generator 380 includes a sector timing generator 382 coupled to a sector pulse width generator 384 via a lead 386. Sector timing generator 382 is coupled to index timing generator 372 via lead 376. Sector timing generator 382 and sector pulse width generator 384 are coupled to receive the system clock signal via lead 365. Sector timing generator 382 and sector pulse width generator 384 are further coupled to DSP interface 315 via bus 317, and are coupled to address decoder 330 via respective leads 338, 339. Sector pulse width generator 384 provides a sector pulse on lead 387.

Generators 362, 364, 372, 374, 382 and 384 are each implemented with a load register coupled to a counter. The register receives values from DSP interface 315 over bus 317. The output of the register is then loaded into the counter. The counter then provides a pulse output. When the count expires, the counters are reloaded and continue counting.

Figure 4:
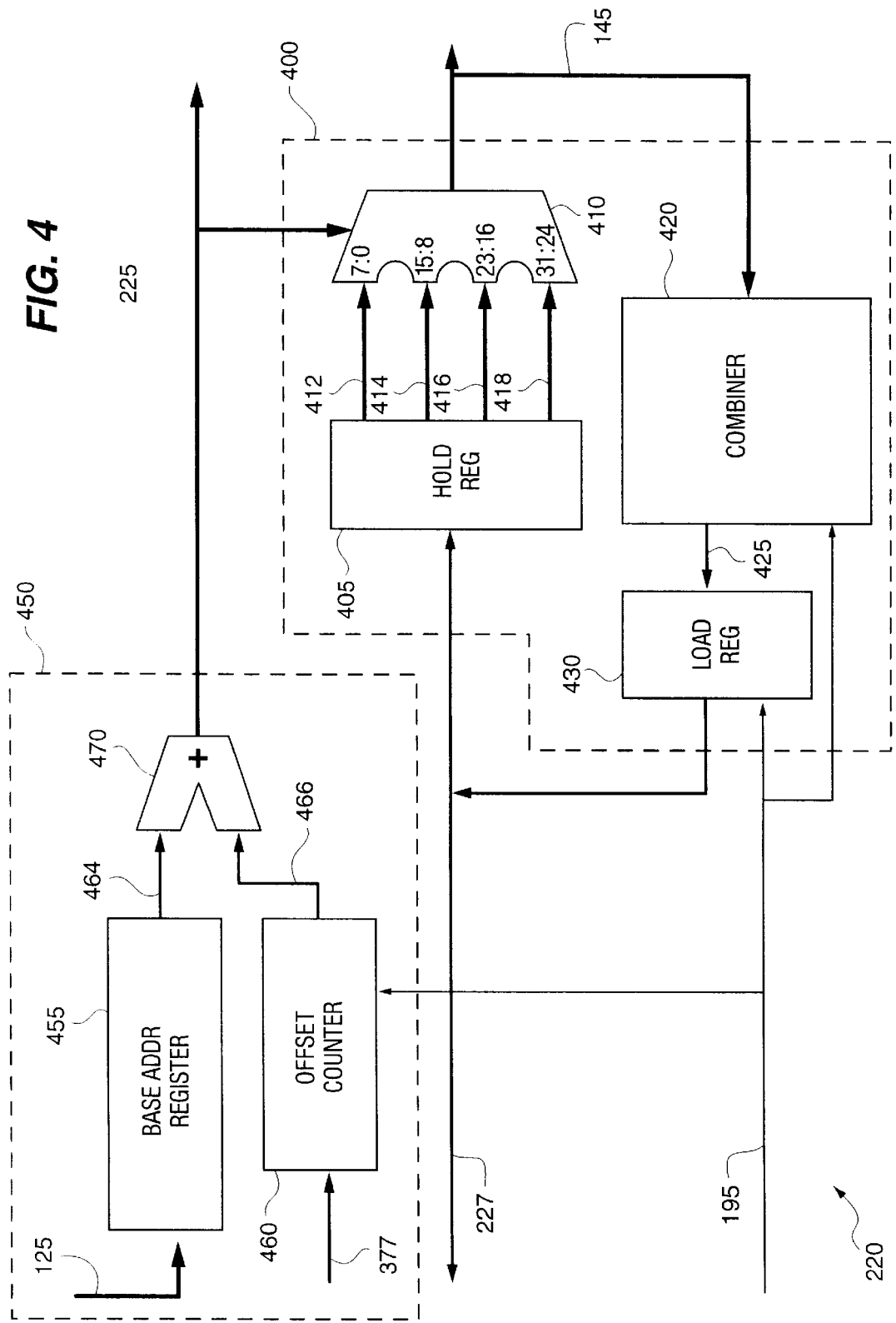
FIG. 4 is a detailed block diagram of the address generation logic illustrated in FIG. 2.

FIG. 4 is a detailed block diagram of address generation logic 220 illustrated in FIG. 2. Address generation logic 220 includes an NRZ combiner logic 400 and an address generator 450. NRZ combiner logic 400 includes a hold register 405 that is coupled to virtual HDA device 200 (FIG. 2) via bus 227. Hold register 405 is preferably a 32-bit register. A multiplexor 410 is coupled to hold register 405 via buses 412, 414, 416 and 418. Multiplexor 410 is coupled to address generator 450 via bus 225 and to data controller 120 (FIG. 1) via bus 145.

A demultiplexor (combiner) 420 is also coupled to data controller 120 via bus 145. Combiner 420 is coupled to a load register 430 via a bus 425. Load register 430 is preferably a 32-bit register. Both combiner 420 and load register 430 are coupled to receive programmable frequency synthesizer clock signal via lead 195. Load register 430 is further coupled to virtual HDA device 200 via bus 227.

The architecture of NRZ mux/combiner 400 provides control of the flow of NRZ data between data controller 120 and virtual HDA device 200. NRZ data flow control is accomplished by combining 8-bit NRZ data into double words as the NRZ data is received from data controller 120. Control is also accomplished by de-multiplexing double words of data into four bytes from the virtual HDA device 200 to data controller 120. The combination of data bytes into double words is preferred to relax timing requirements of the SRAMs included in virtual HDA device 200.

Address generator 450 includes a base address register 455 coupled to CPU 190 via bus 125, and an offset counter 460. Offset counter 460 is also coupled to index pulse generator 370 (FIG. 3) via lead 377, and coupled to receive the programmable frequency clock via lead 195. A adder 470 is coupled to base address register 455 and offset counter 460 via respective leads 464, 466. Adder 470 preferably is an adder, but can be implemented with any circuit that performs an equivalent mathematical or logical function.

Adder 470 provides an address to virtual HDA device 200 via bus 225. Bits 0 and 1 of the address provided from adder 470 onto bus 225 are used as control states for a multiplexor 410. Eighteen bits of the address provided on bus 225 are then provided to virtual HDA device 200. Five bits of the address are used to select the banks of the SRAM included in virtual HDA device 200.

Offset counter 460 outputs values at the frequency of the programmable frequency clock signal. A value indicates how far the current virtual HDA device 200 address is from the beginning of the virtual track, i.e., the current data location. The beginning of the virtual track is signaled by the generation of the index pulse. Offset counter 460 is a preferred 20-bit counter that is reset by either a leading edge of the index pulse, or a master reset. The twenty bits of offset counter 460 allow each virtual track to be up to 1 Mb in length.

The operation of HDA simulator 140 will be described with particular reference to FIGS. 3 and 4. Upon "boot up," DSP 240 constructs a look-up table that associates hard disk zones to particular frequencies of the programmable frequency clock signal provided on lead 195. During operation, as illustration, CPU 190 provides DSP 240 via DSP/μP mailbox 310 the specific zone for a data transfer with virtual HDA device 200 and whether the data transfer is a read or write.

DSP 240 then determines from the look-up table the frequency of the programmable frequency clock signal. The determined frequency is then programmed into frequency synthesizer 325 via output logic 320 and DSP interface 315. In response, frequency synthesizer 325 outputs an altered frequency clock signal having determined the new frequency from the look-up table. DSP 240 also provides a series of addresses to address decoder 330 to enable the loading of the load registers in generators 362, 364, 372, 374, 382 and 384 of timing generator 350.

Figures 5A, 5B, 5C:
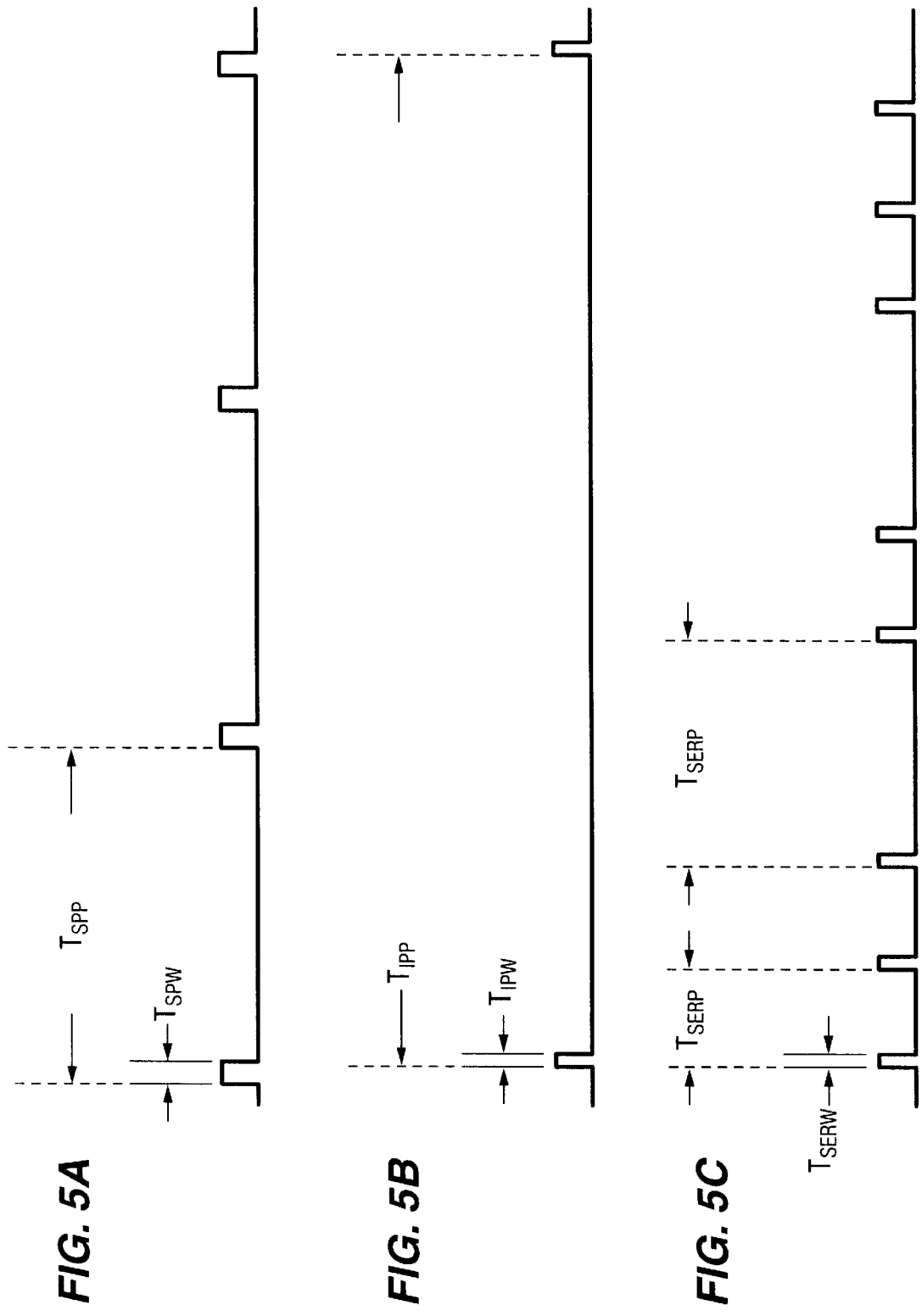
FIGS. 5A–C illustrate the pulses provided by the timing generator illustrated in FIG. 3.

By preference, servo timing generator 362 is the block from which the index and sector pulses are derived. Preferably, servo timing generator 362 is a free running counter clocked by the 40 MHz system clock signal which generates servo pulses of programmable period and duration. Reference is made to FIG. 5A that illustrates servo pulses. The resolution of the servo pulse period $T_{spp}$ is preferably 800 ns and the resolution of the servo pulse width $T_{spw}$ is preferably 100 ns.

Referring to FIG. 5B, index pulses are generated in response to the falling edge of the servo pulse (on lead 367) or on an occurrence of an Immediate Index (explained below). The index pulse is regularly generated after a programmable number of servo pulses have occurred. The resolution of the index pulse width $T_{Ipw}$ is preferably 1.6 μs. The preferred index period is a multiple of the servo pulse period $T_{spp}$. A servo pulse counter (not shown) coupled to lead 367, which is reset by the index pulse, counts servo pulses. This counter can be read by DSP 240 to determine simulated rotational position.

Optionally, DSP 240 can generate index pulses at any time by setting a control bit for index pulse generator 370. When this bit is set, an index pulse is generated on the falling edge of the next servo pulse and the servo pulse counter is reset to zero. This function is called Immediate Index, and it forces a new index pulse to occur.

Turning to FIG. 5C, it is preferred that sector pulses are generated at irregular intervals, but are always synchronized by index. When an index pulse is detected, a sector pulse is generated, the counters of sector pulse width and sector timing generators 372, 374 are loaded from their respective load registers and begin to count down. Before the counters expire, the load registers will be reloaded by DSP 240 for the next sector. It is preferred that only a new sector period will be programmed, while the previous value for the sector pulse width is maintained.

When the counters expire, a sector pulse is generated, the values in the load registers are reloaded by DSP 240 and the cycle repeats. DSP 240 updates the load registers each sector to ensure appropriate sector generation. The resolution on the sector pulse period $T_{SERP}$ is preferably 50 ns. The resolution on the sector pulse width $T_{SERW}$ is preferably 800 ns.

Base address register 455 of FIG. 4 is programmed by CPU 190 with a base value that corresponds to the hard disk track from which the data transfer is desired. Offset counter 460 receives the index pulse over lead 377 and the programmable frequency clock signal on lead 195 with the predetermined frequency. Adder 470 preferably sums the corresponding hard disk track value with each count output of offset counter 460. The sum is then provided as an address to virtual HDA device 200.

If CPU 190 indicated the data transfer is a write, then data controller 120 provides NRZ data over bus 145 to combiner 420. Combiner 420 then loads load register 430 with a preferred double word (32 bits). The double word is then provided to virtual HDA device 200 over bus 227.

If CPU 190 indicated the data transfer is a read, then virtual HDA device 200 provides the data over bus 227, which corresponds to the address provided to virtual HDA device 200 over bus 225. The information, a double word, is loaded into hold register 405. Bits 1 and 0 of the address provided on bus 225 determine which byte from hold register 405 is multiplexed onto bus 145. The multiplexed bytes are then provided as NRZ data to data controller 120.

With the present invention providing a base value combined with an offset value that is responsive to the programmable frequency clock corresponding to sectors of a zone, physical addresses are generated and incremented that simulate the rotational latency of a rotating hard disk. As such, the present invention is particularly suited for testing data controllers, as exemplified in FIG. 1.

Numerous variations and modifications of the embodiment described above may be effected without departing from the spirit and scope of the novel features of the invention. For example, the pulse widths and periods can be changed as desired. It is to be understood that no limitations with respect to the specific device illustrated herein are intended or should be inferred. It is, of course, intended to cover by the appended claims all such modifications as fall within the scope of the claims.

We claim:

1. A device for generating a physical address and simulating rotational latency of a hard disk based on the physical address comprising:

a frequency synthesizer;

a DSP configured to receive a hard disk zone for a data transfer and communicate a value of a corresponding programmable frequency clock signal to the frequency synthesizer;

an index pulse generator for generating an index pulse that simulates a hard disk index pulse;

a servo pulse generator for generating servo pulses after a number of index pulses have been generated, wherein the DSP is configured to use the servo pulses to determine a simulated rotational position of the hard disk;

said frequency synthesizer being configured for generating said programmable frequency clock signal that corresponds to said hard disk zone;

an offset counter coupled to receive the index pulse and the programmable frequency clock signal, wherein the offset counter generates values in response to the programmable frequency clock signal, wherein the values correspond to sectors of said hard disk zone; and a base address register for storing a base address that corresponds to a hard disk track, wherein the base address and the offset counter values are combined to provide a physical address that corresponds to a sector of a hard disk track, wherein the device is configured to manipulate the physical address to simulate rotational latency of the hard disk without having to simulate actual movement of a head of the hard disk.

2. The device of claim 1 wherein the offset counter is reset in response to the index pulse to simulate a beginning of a hard disk track.

3. The device of claim 1 wherein the index pulse generator is programmable for an index pulse width and index pulse period.

4. A hard disk simulator apparatus for generating an address and simulating rotational latency of a hard disk based on the address comprising:

an address generator;

a DSP configured to receive a hard disk zone for a data transfer and communicate a value of a corresponding programmable frequency clock signal to the address generator, wherein said address generator receives the value of the corresponding programmable frequency clock signal and generates addresses for a hard disk;

a timing generator controller coupled to receive address, data and control signals;

a timing generator for providing pulses to the address generator in response to signals received from the timing generator controller, wherein the device is configured to manipulate the address to simulate rotational latency of the hard disk without having to simulate actual movement of a head of the hard disk.

5. The simulator of claim 4 wherein the address generator includes an offset counter that generates values in response to the programmable frequency clock and the pulse.

6. The simulator of claim 5 wherein the address generator receives a base address that corresponds to a hard disk track.

7. The simulator of claim 6 wherein the offset counter values and the base address are combined to provide an address.

* * * * *